United States Patent Office 3,630,975
Patented Dec. 28, 1971

3,630,975
SOLVENT RESISTANT HOLLOW BEADS OF VINYL CHLORIDE COPOLYMERS WITH ETHYLENE AND A NON-CONJUGATED DIENE
Frank Wingler, Leverkusen, Herbert Bartl, Odenthal, Hanenberg, and Robert Zollner, Leverkusen, Germany, assignors to Farbenfabriken Bayer Aktiengesellschaft, Leverkusen, Germany
No Drawing. Filed Apr. 29, 1969, Ser. No. 820,291
Claims priority, application Germany, May 21, 1968, P 17 70 462.0
Int. Cl. C08d *13/08;* C08f *47/10*
U.S. Cl. 260—2.5 B                                         3 Claims

ABSTRACT OF THE DISCLOSURE

A solvent resistant hollow bead of ethylene, vinyl chloride and a crosslinking monomer, process of producing the same and the utility of such beads in the production of foams and in coating compositions.

---

This invention relates to solvent-resistant hollow beads of ethylene, vinyl chloride and a crosslinking monomer, and to a process for their production.

According to an earlier proposal, hollow beads of a very low specific gravity and limited diameter can be obtained from copolymers of vinyl chloride, ethylene and optionally propylene (cf. Belgian patent specification No. 702,673). In this process, the aforementioned monomers are copolymerised up to a conversion rate of 95%, and the copolymer formed is expanded with the residual monomers still present in the polymer to form hollow beads. Expansion may optionally be carried out with expanding agents which are under pressure before the expanding process, or with liquids which are converted into gases at temperatures below 150° C., or with compounds whose cleavage is accompanied by chemical decomposition. One disadvantage of these hollow beads is that they are not sufficiently resistant to solvents for certain applications. Thus, the ethylene/vinyl chloride hollow beads may be mixed, for example, with coating agents containing water or petrol, but not with coating agents containing esters or aromatic compounds.

Accordingly, the object of this invention is to prepare solvent-resistant hollow beads from copolymers based on ethylene, vinyl chloride and optionally propylene.

The invention thus relates to a process for the production of solvent-resistant hollow beads from a vinyl chloride copolymer wherein from 60 to 91.99%| by weight of vinyl chloride, from 30 to 8% by weight of ethylene or from 30 to 8% by weight of ethylene and propylene in which case the propylene content may amount to from 0.1 to 15% by weight and from 10 to 0.01% by weight of a compound with more than one copolymerisable double bond are copolymerised and the resulting copolymers are expanded into hollow beads from 15µ to 3 mm. in diameter.

It was surprising that hollow beads based on vinyl chloride copolymers, which are resistant to all the usual solvents, could be produced by the process according to the invention. In fact, the finely divided, highly branched or crosslinked copolymer particles, prepared by block or suspension polymerisation, had been expected to lose their expansibility during copolymerisation of the ethylene and vinyl chloride and, optionally propylene with the bond, so that they could not be expanded into hollow beads.

The following are examples of monomers containing more than one copolymerisable double bond which are suitable for use in the process according to the invention: polyallyl compounds such as triallyl isocyanurate diallyl isocyanurate, trimethylol propane triallyl ether, trimethylol propane diallyl ether and triallyl phosphate; polyvinyl compounds, such as di-and tri-vinyl benzenes and the corresponding toluene derivatives or vinyl esters of polybasic carboxylic acids such as divinyl adipate, divinyl maleate, and divinyl phthalate; vinyl or allyl esters of unsaturated carboxylic acids, for example allyl acrylate, allyl methacrylate, diallyl itaconate, diallyl fumarate; and acrylic and methacrylic esters of polyfunctional alcohols, for example, ethylene glycol diacrylate, ethylene glycol dimethacrylate, methyl norbornenyl acrylic ester, and acrylic and methacrylic esters of hydroxyalkyl acrylic and methacrylic esters.

The following are preferably used: triallyl isocyanurate, triallyl phosphate, ethylene glycol diacrylate, ethylene glycol dimethacrylate, divinyl adipate, trimethylol propane trimethacrylic acid ester, allyl acrylate, allyl methacrylate, and hydroxymethyl norbornenyl acrylic acid ester.

The compounds listed above may be added to the polymerisation mixtures in quantities of from 0.01 to 10% by weight, and preferably in quantities of from 0.05 to 5% by weight, based on the total monomers, without depriving the polymer particles of their expansibility and hence without eliminating the most important requirement for the expansion process. It is, of course, also possible to copolymerise other monomers, such as vinyl acetate, methyl acrylate and methyl methacrylate, maleic and fumaric acid esters, vinylidene chloride, or acrylonitrile in relatively small quantities providing they do not interfere in any way with the development of the hollow beads.

The hollow beads are preferably obtained by copolymerising vinyl chloride and ethylene or ethylene and propylene with the polyfunctional monomers referred to above by the suspension polymerisation methods and conditions disclosed in Belgian patent specification No. 702,673 As stated in this patent specification, the beads are expanded with gases at room temperature or at elevated temperature, preferably with the residual monomers either alone or in admixture with other expanding agents. The expansion process is carried out at temperatures of from 0 to 100° C. The hollow beads which incorporate compounds containing more than one, and preferably from 2 to 4, copolymerisable olefinic double bonds as co-monomers, do not need to be after-treated.

The crosslinked hollow bead polymers according to the present invention are eminently suitable in the production of foams. The production of foams from these hollow beads may be carried out, for example, in accordance with Belgian patent specification Nos. 707,643 and 724,165. Compared with foams obtained from uncrosslinked materials, foams based on these crosslinked materials show an improved thermal stability under load and are less inclined to contract. Thus, foam panels prepared from a copolymer of 86 parts by weight of vinyl chloride, 13.9 parts by weight of ethylene and 0.1 part by weight of triallyl isocyanurate, are able to withstand brief heat treatments at 80° C.

The particular advantage of the hollow beads obtained in accordance with the present invention is their resistance to solvents. They are resistant to benzene, toluene, methylene chloride, chloroform, ethyl acetate, ether, acetone, various plasticisers, olefinic monomers such as styrene, vinyl acetate, acrylonitrile, acrylates, and to isocyanates, polyesters, polyethers, epoxides or amines. They are therefore eminently suitable for use as fillers in lacquers, paints, coating compositions, surfacing compositions, casting resins based on polyesters, styrene or acrylates, epoxides or siloxanes. They may be used with advantage anywhere where a high resistance to solvents is required. By virtue of their high chlorine content, the hollow beads are almost non-flammable and, when incorporated in polyurethane foams, improve their fireproof properties. The hollow beads obtained in the examples are unaffected by the solvents mentioned earlier on.

EXAMPLE 1

A solution of 8.4 g. of methyl cellulose in 4.8 litres of desalted water is introduced under nitrogen into a 10 litre capacity autoclave, followed by the addition of 1.4 g. of triallyl isocyanurate in solution in 30 cc. of pentane, and 4.3 g. of cyclohexyl peroxydicarbonate. 1350 g. of vinyl chloride, 50 g. of propane and 900 g. of ethylene are introduced under pressure while stirring with an anchor stirrer (300 to 400 r.p.m.). Polymerisation is continued for 1 hour at 45° C. and then for 12 hours at 50° C. The autoclave is depressurised at 50° C. 200 litres of hollow beads from 0.5 to 1.5 mm. in diameter with an ethylene content of 13.5% by weight and a triallyl isocyanurate content of 0.1% by weight, are obtained.

EXAMPLE 2

As described in Example 1, 2000 g. vinyl chloride, 750 g. of ethylene, 20 g. of propylene and 3 g. of triallyl isocyanurate are copolymerised for 17 hours at 45° C. with 4 g. of cyclohexyl peroxydicarbonate in 4.0 litres of a 0.1% by weight aqueous methyl cellulose solution. The stirrer is set to rotate at 610 r.p.m. After depressurisation, 100 litres of micro beads from 50 to 150$\mu$ in diameter are obtained. Chlorine analysis shows that their ethylene and propylene content is 8.5% by weight and their triallyl isocyanurate content is 0.15% by weight.

EXAMPLE 3

A mixture of 4.8 litres of water, 8.4 g. of methyl cellulose, 4.3 g. of cyclohexyl peroxydicarbonate, 50 g. of propane, 1350 g. of vinyl chloride, 900 g. of ethylene and 15 g. of itaconic acid diallyl ester is polymerised as described in Example 1. Polymerisation is continued for 12 hours at 50° C. The autoclave is depressurised at 50° C. 200 litres of hollow beads from 0.5 to 1 mm. in diameter are obtained. The copolymer contains 1% by weight of copolymerised itaconic acid diallyl ester and 13.5% by weight of copolymerised ethylene.

EXAMPLE 4

The procedure is as in Example 3, except that the itaconic acid diallyl ester is replaced by 30 g. of ethylene glycol dimethacrylate. 150 litres of foam are obtained. The foam can be moulded into panels, even in the absence of binders. After drying at room temperature and rolling over a roller heated to 80° C., a foam is obtained which does not contract when benzene is poured over it. The copolymer contains 2.0% by weight of copolymerised ethylene glycol dimethacrylate and about 12.5% by weight of copolymerised ethylene.

EXAMPLE 5

The procedure is as described in Example 3, except that 13.5 g. of trimethylol propane trimethacrylic ester are added to the mixture instead of itaconic acid diallyl ester. 200 litres of a foam of a copolymer with an ethylene content of 14.1% by weight, a trimethylol propane trimethacrylic ester content of 0.9% by weight and a vinyl chloride content of 85% by weight are obtained. Panels obtained from this foam by the process described in Belgian patent specification No. 707,643 can be rolled at 90° C. without any damage to the structure of the foam.

EXAMPLE 6

The procedure is as described in Example 3, 10 g. of divinyl adipate in solution in 20 g. of n-pentane being added as cross-linker. 100 litres of micro beads from 150 to 25$\mu$ in diameter, eminently suitable for use as a filler in polyester resins, are obtained. The copolymer has an ethylene content of 14.4% by weight and a divinyl adipate content of 0.7% by weight.

EXAMPLE 7

The procedure is as described in Example 3, except that 2 g. of ethylene glycol diacrylate dissolved in 5 g. of tert.-butanol are added as crosslinker. 450 litres of beads from 1.5 to 2 mm. in diameter are obtained. Foam panels produced from this material have a density of 5.6 g./l. The copolymer has an ethylene content of 11.9% by weight and an ethylene glycol diacrylate content of 0.14% by weight.

EXAMPLE 8

The procedure is as described in Example 3, except that 10 g. of allyl acrylate are used as crosslinker. 200 litres of hollow beads of a copolymer with an allyl acrylate content of 0.6% by weight and an ethylene content of 13.3% by weight are obtained.

EXAMPLE 9

15 g. of hydroxy methyl norbornenyl acrylic ester are added as crosslinker to the reaction mixture described in Example 3, polymerisation being continued for 12 hours at 50° C. Following depressurisation, 250 litres of hollow beads are obtained. The copolymer contains 1% by weight of crosslinker and 13% by weight of ethylene. As in all the preceding examples, the vinyl chloride content is equal to the difference between 100% and the content of ethylene and crosslinker.

We claim:
1. A process for the production of solvent-resistant hollow beads from a vinyl chloride copolymer wherein from 60 to 91.99% by weight of vinyl chloride, from 30 to 8% by weight of ethylene or from 30 to 8% by weight of ethylene and propylene wherein the propylene content is from 0.1 to 15% by weight, and from 10 to 0.05% by weight of a compound with more than one nonconjugated copolymerisable double bond are copolymerised and the resulting polymers are expanded into hollow beads from 15$\mu$ to 3 mm. in diameter.

2. Solvent-resistant hollow beads from 15$\mu$ to 3 mm. in diameter consisting of a copolymer of from 60 to 91.99% by weight of vinyl chloride, from 30 to 8% by weight of ethylene or from 30 to 8% by weight of ethylene and propylene wherein the propylene content is from 0.1 to 15% by weight, and from 10 to 0.05% by weight of a compound with more than one nonconjugated copolymerisable double bond.

3. Solvent-resistant hollow beads as claimed in claim 2, wherein the compound containing more than one copolymerisable double bond is a monomer with from 2 to 4 olefinic double bonds.

References Cited

UNITED STATES PATENTS

| 2,875,186 | 2/1959 | Gerhard | 260—2.5 B |
| 3,066,110 | 11/1962 | Cornell | 260—2.5 P |
| 3,359,193 | 12/1967 | Pinner | 260—2.5 |

FOREIGN PATENTS

| 702,673 | 10/1967 | Belgium | 260—2.5 |
| 1,544,725 | 11/1968 | France | 260—2.5 |

PAUL LIEBERMAN, Primary Examiner

U.S. Cl. X.R.

260—2.5 P, 17 A, 78.5 B, 78.5 UA, 78.5 CL, 78.5 HC, 80.6, 80.78, 827, 836, 837 PV, 837 R, 873, 897